United States Patent [19]
Simon

[11] Patent Number: 5,537,846
[45] Date of Patent: Jul. 23, 1996

[54] CONTROL PEDAL DISABLING DEVICE

[76] Inventor: David A. Simon, 21711 Eastbrook Ct., Grosse Pointe Woods, Mich. 48236

[21] Appl. No.: 112,555

[22] Filed: Aug. 26, 1993

[51] Int. Cl.$^6$ .............................................. F16H 57/00
[52] U.S. Cl. .................................. 70/202; 70/201; 70/237
[58] Field of Search ............................ 70/203, 237, 201, 70/202, 198–200, 238, 254; 269/172, 179, 95, 146

[56] References Cited

U.S. PATENT DOCUMENTS

| | | | |
|---|---|---|---|
| 777,611 | 8/1904 | Dodge | 269/172 |
| 1,097,081 | 5/1914 | Coon . | |
| 1,267,926 | 5/1918 | Maurer | 70/202 |
| 1,388,149 | 8/1921 | Friedrich . | |
| 1,442,203 | 1/1923 | Williams | 70/202 |
| 1,531,062 | 3/1925 | Barravecchia | 70/202 |
| 2,216,858 | 10/1940 | Steinbrink | 269/95 |
| 2,317,195 | 1/1941 | Husted | 269/146 |
| 2,812,789 | 11/1957 | Hutson . | |
| 2,973,792 | 3/1961 | Fonken | 269/146 |
| 3,435,646 | 4/1961 | Michnoff | 70/203 |
| 3,550,409 | 12/1970 | Pariser | 70/203 |
| 4,076,095 | 2/1978 | Adamski | 180/114 |
| 4,333,326 | 6/1982 | Winters | 70/203 |
| 4,493,198 | 1/1985 | Brown | 70/203 |
| 4,732,019 | 3/1988 | Tolar | 70/203 |
| 4,876,865 | 10/1989 | Trinidad et al. | 70/203 |
| 4,995,250 | 2/1991 | Chiou | 70/202 |
| 5,213,388 | 5/1993 | Baker | 296/65.1 |
| 5,345,796 | 9/1994 | Chieh | 70/237 |

*Primary Examiner*—Steven N. Meyers
*Assistant Examiner*—Gary Estremsky
*Attorney, Agent, or Firm*—Young & Basile

[57] ABSTRACT

A motor vehicle anti-theft device adapted to disable the brake pedal of the vehicle. The device includes an outer housing and an inner shaft member mounted within the housing for relative rotary and telescopic movement. A first clamp structure is journaled on the shaft and a second clamp structure is threaded on the shaft so that, as the shaft is rotated in the housing, the clamp members are moved toward and away from each other into and out of locking engagement with the brake pedal. The inner shaft and outer housing are slid telescopically relative to each other to firmly engage the fire wall of the vehicle with the clamp members clamped about the brake pedal. A lock structure is provided to preclude relative rotary and relative longitudinal movement of the housing and the shaft. The device functions to lock the pedal in a brake released position so that the vehicle cannot be started since the brake/shift interlock cannot be actuated.

10 Claims, 4 Drawing Sheets

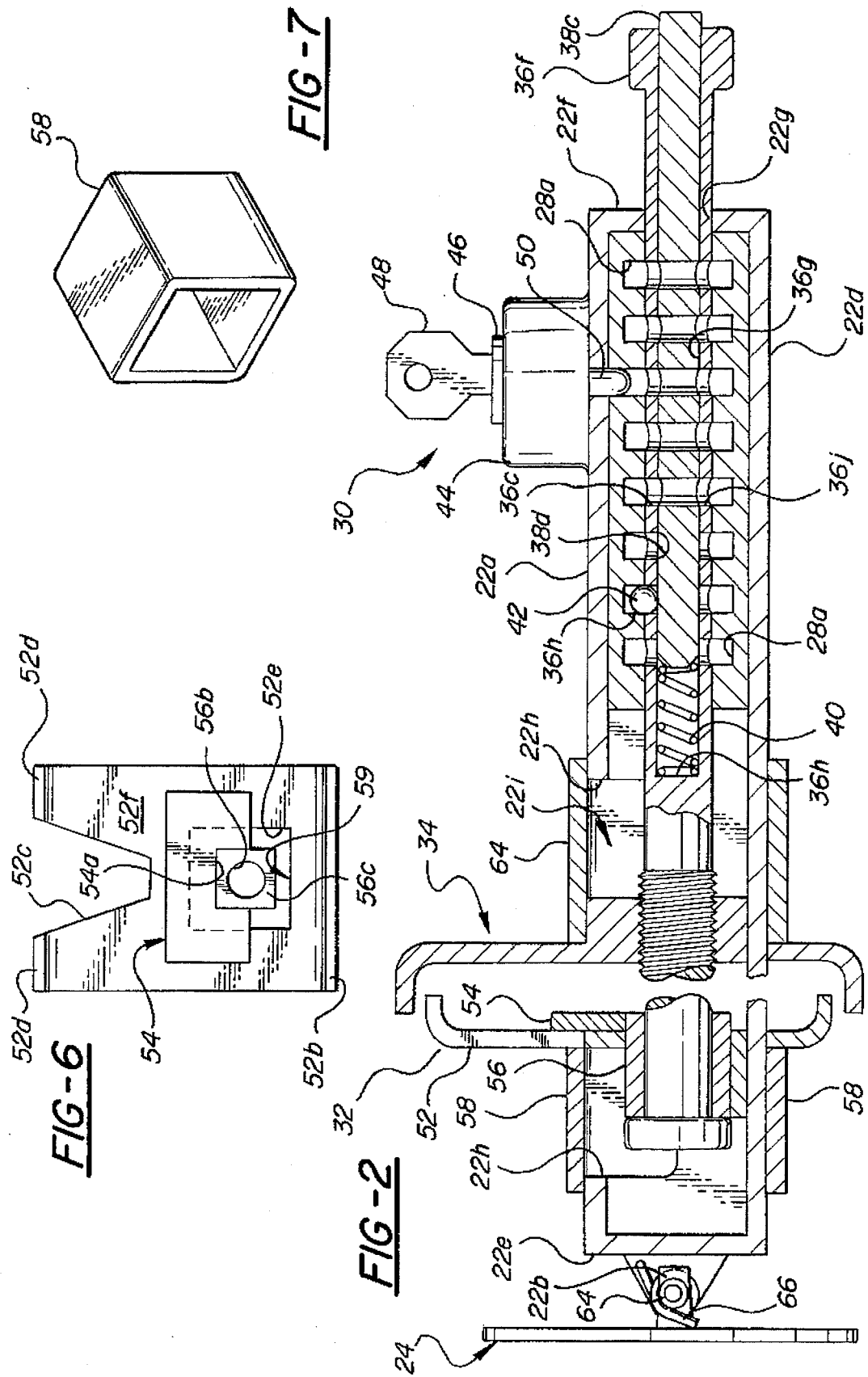

CONTROL PEDAL DISABLING DEVICE

BACKGROUND OF THE INVENTION

This invention relates to locking devices for motor vehicles and more particularly to a motor vehicle anti-theft device which disables the brake pedal of the motor vehicle.

Many anti-theft devices have been proposed to prevent the theft of motor vehicles. The prior art devices include alarm devices which sound an audible signal upon an attempt to force entry into the vehicle, various devices to disable the steering mechanism of the vehicle, various devices to preclude operation of the control pedals of the vehicle, and various devices interlocking a control pedal and the steering wheel to preclude operation of either. However, the alarm devices are relatively easily defeated by a knowledgeable thief and the various devices disabling the control pedal and/or steering wheel are relatively easily defeated by suitable shearing or snipping tools.

SUMMARY OF THE INVENTION

This invention is directed to the provision of an improved anti-theft device for a motor vehicle.

More specifically, this invention is directed to the provision of an improved anti-theft device for a motor vehicle which is simple and inexpensive in construction and which is very difficult for even a very experienced and knowledgeable thief to defeat.

The invention anti-theft device is of the type that disables a control pedal of a vehicle to preclude operation of the control pedal. According to the invention the device includes inner and outer elongated members mounted for relative rotary and longitudinal sliding movement, a pair of clamp members, and means operative in response to relative rotation of the elongated members to move the clamp members together. The device is applied to the pedal by positioning the clamp members on opposite sides of the pedal whereafter the elongated members are relatively slid to move the end of one of the elongated members against the vehicle fire wall whereafter the members are relatively rotated to clamp the clamp members on the pedal whereafter a suitable locking device is actuated to lock the inner and outer members against relative rotary and longitudinal movement. This arrangement presents a simple and inexpensive device that is extremely difficult to defeat.

According to a further feature of the invention, the inner elongated member comprises a shaft which is mounted for rotary movement within the outer elongated member and which includes a threaded portion engaging a nut constituting a part of one of the clamp member and a bearing portion journaling a bushing constituting a part of the other clamp member. With this arrangement, rotation of the inner shaft within the outer elongated member has the effect of moving the clamp members toward or away from each other to selectively clamp or release the brake pedal therebetween.

According to a further feature of the invention, the inner shaft and outer elongated members cooperate to define a plurality of longitudinally spaced detent means so that the members may be selectively longitudinally adjusted to a plurality of positions corresponding to the plurality of detent positions defined by the detent means.

According to a further feature of the invention, the locking means comprises a key lock mounted on the outer elongated member and including a plunger member arranged to move into and out of locking engagement with the inner shaft to preclude rotation of the inner shaft within the outer elongated member and longitudinal movement of the inner shaft within the outer elongated member.

In the disclosed embodiment of the invention, the outer elongated member comprises a hollow tubular housing having an opening defined along one face thereof and the clamp members are mounted for sliding movement within the hollow housing and extend out of the hollow housing through the opening in the housing for access to the control pedal of the vehicle.

BRIEF DESCRIPTION OF THE DRAWINGS

FIG. 2 is a cross-sectional view taken on line 2—2 of FIG. 1;

FIGS. 4, 5 and 6 are perspective, front, and rear views of a front clamp structure utilized in the invention device;

FIG. 7 is a perspective view of a cover sleeve forming a part of the front clamp structure;

DETAILED DESCRIPTION OF THE PREFERRED EMBODIMENT

Figure 1:
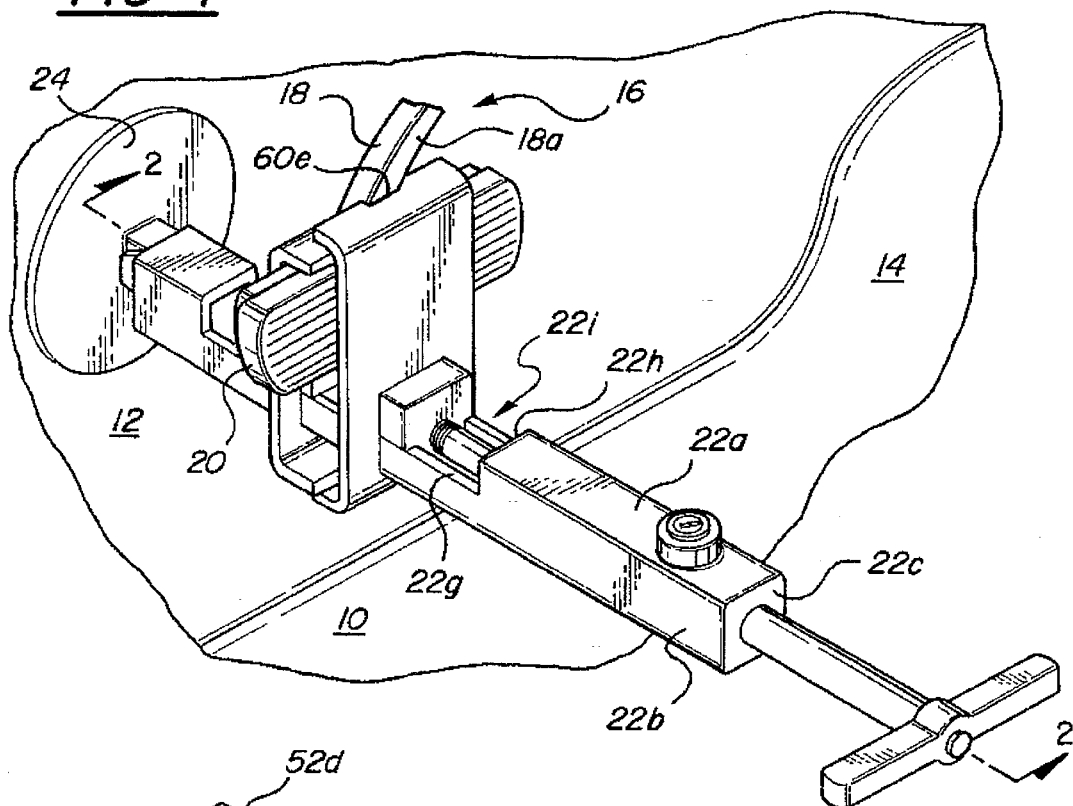
FIG. 1 is a perspective view of the invention device shown in disabling relation to the brake pedal of a motor vehicle.
Figure 4:
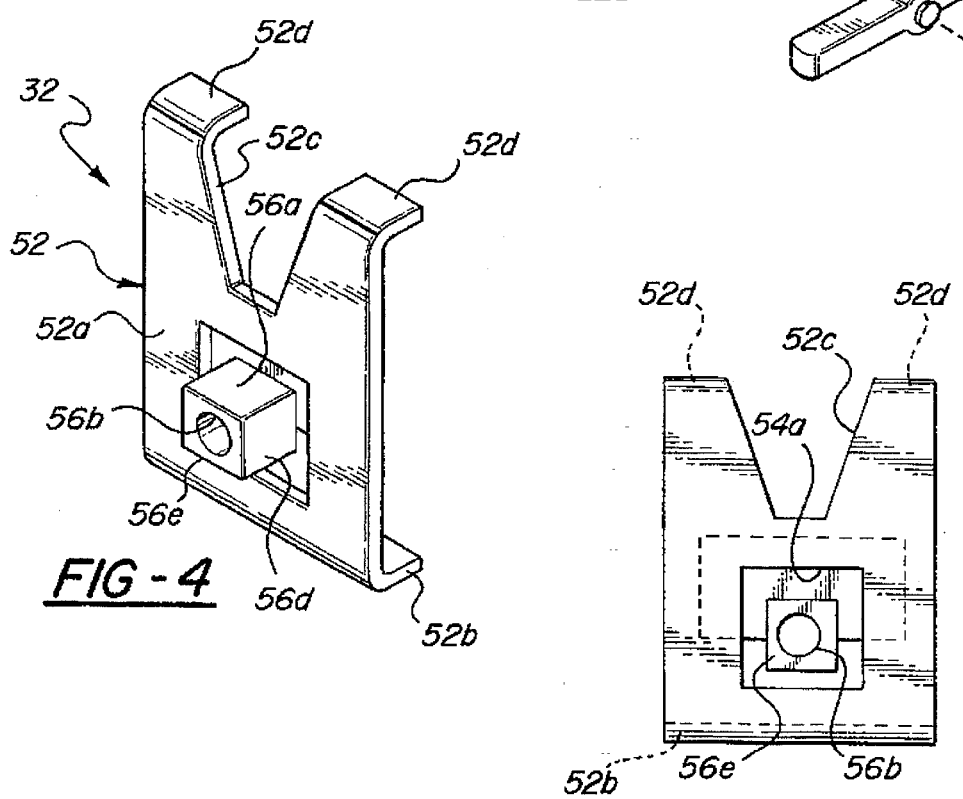
Figure 5:
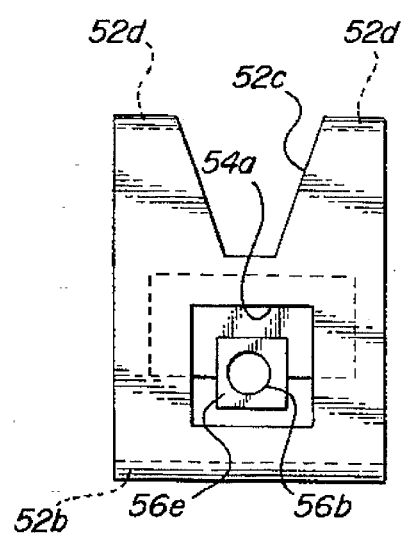
Figure 3:
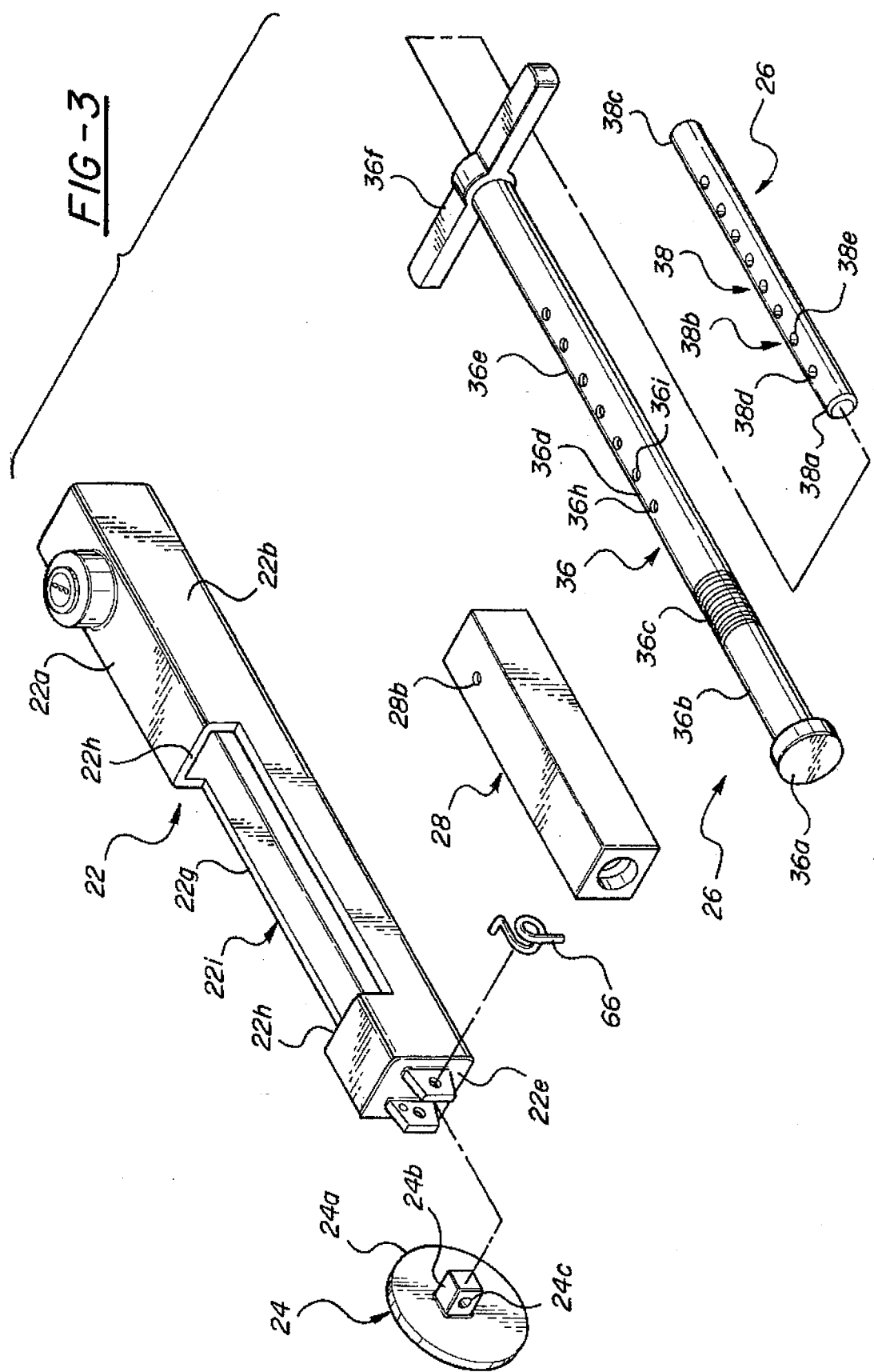
FIG. 3 is a view showing the components of the device in exploded relation.
Figure 8:
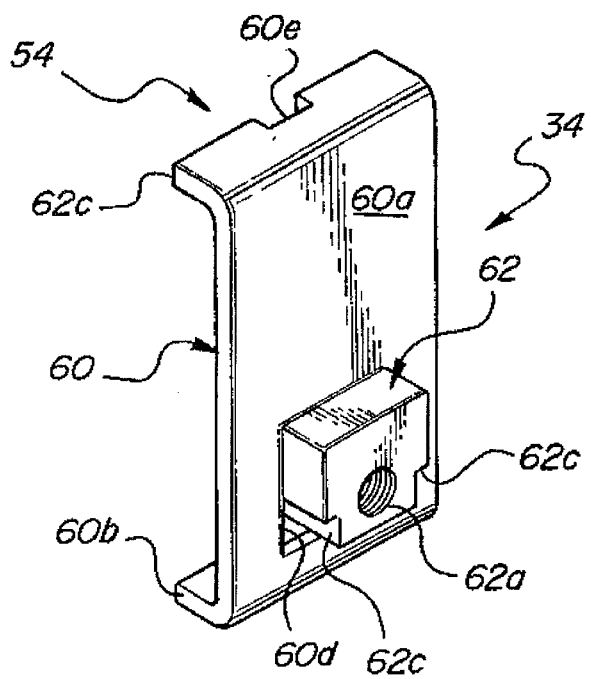
FIGS. 8, 9 and 10 are perspective, front, and rear views of a rear clamp structure utilized in the invention device.
Figure 9:
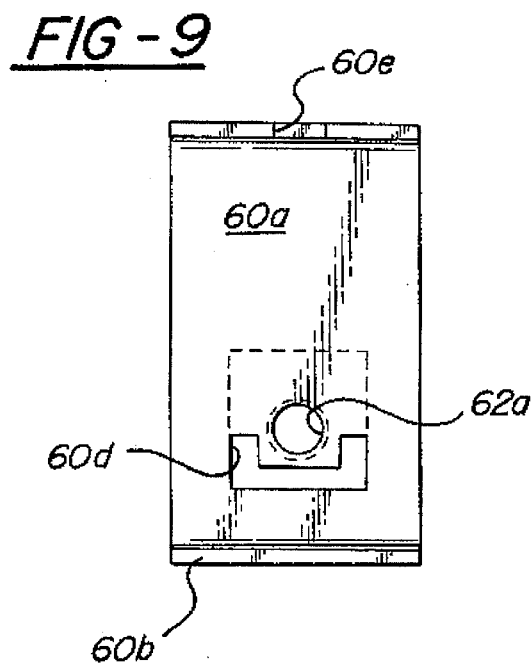
Figure 10:
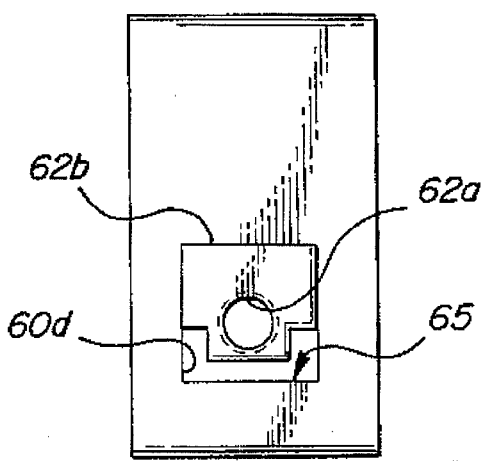
Figure 11:
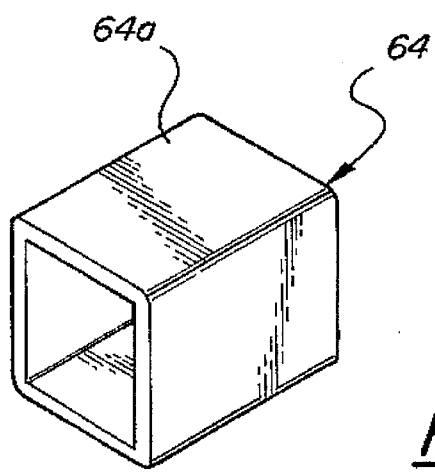
FIG. 11 is a perspective view of a cover sleeve forming a part of the rear clamp structure.

The invention anti-theft device is seen in FIG. 1 in association with a motor vehicle including a floorboard 10, a fire wall 12, a transmission hump 14, and a brake pedal 16 including a pedal arm 18 and a pedal pad 20.

The invention anti-theft device includes an outer elongated housing member 22, a foot 24, an inner elongated shaft assembly 26, a detent tube 28, a lock assembly 30, a front clamp structure 32, and a rear clamp structure 34. All of the elements of the device are formed of a suitable ferrous material.

Housing member 22 has an elongated tubular square cross-sectional configuration and includes an upper wall 22a, side walls 22b and 22c, a bottom wall 22d, a front wall end wall 22e and a rear end wall 22f. Side walls 22b and 22c are cut away at 22g, and top wall 22a is cut away at 22h, to form an upwardly opening 22i in the housing member 22.

Foot 24 comprises a circular plate including a main body plate portion 24a and a central lug portion 24b having a bore 24c.

Shaft assembly 26 includes a shaft 36, a push rod 38, a spring 40, and a detent ball 42.

Shaft 36 has a round cross-sectional configuration and includes a front end flange portion 36a, a journal or bearing portion 36b, a threaded portion 36c, a detent portion 36d, a locking portion 36e, and a rear handle portion 36f.

Detent portion 36d and locking portion 36e define a central bore 36g. Detent portion 36d includes a detent aperture 36h opening in central bore 36g. Locking portion 36e includes a plurality of pairs of aligned apertures 36i, 36j. Apertures 36i are axially aligned with detent aperture 36h and apertures 36j are diametrically opposed to apertures 36i.

Push rod 38 has a round cross-section and is sized to fit slidably in bore 36g. Push rod 38 includes a front portion 38a, a main body portion 38b, and a rear portion 38c. A detent hollow 38d is provided in front portion 38a and a plurality of axially spaced locking through bores 38e are provided in main body portion 38b in axial alignment with detent hollow 38d. The axial spacing of locking bores 38e corresponds to the axial spacing of aperture pairs 36i, 36j in shaft 36.

Spring 40 comprises a coil spring of known form and is sized to fit within bore 36g.

Detent ball 42 comprises a spherical ball member sized to seat in detent hollow 38d and sized to project upwardly out of, but not upwardly through, detent aperture 36h.

Detent tube 28 has a square outer cross-sectional configuration and a round inner cross-sectional configuration. Tube 28 is sized to fit within the square cross-sectional configuration of housing 22. A plurality of axially spaced annular detent grooves 28a are provided on the circular inner periphery of the detent tube. The inner periphery of the detent tube is sized to slidably receive shaft 36 and the detent grooves 28a are spaced axially by an amount corresponding to the spacing between detent apertures pairs 36i, 36j in tube 36 and locking bores 38e in push rod 38.

A locking pin bore 28b is provided in the top wall of the detent tube proximate the rear end of the tube. Bore 28b opens at its inner end in one of the detent grooves 28a.

Lock assembly 30 includes a housing 44 integral with the upper wall 22a of housing 22, a push button 46, a key 48, a pin tumbler mechanism (not shown) within housing 44, and a locking pin 50. Lock assembly 30 may, for example, be of the type available from the Chicago Lock Company of Chicago, Ill. as Part No. 1770.

Front clamp structure 32 includes a clamp plate 52, a mounting plate 54, a bushing or actuator 56, and a cover sleeve 58.

Clamp plate 52 includes a main body portion 52a of planar configuration, a lower flange portion 52b, a v-shaped cutout 52c in the main body portion defining a pair of upper flange portions 52d, and a square opening 52e in main body portion 52a having a size and configuration conforming to the size and configuration of housing 22.

Mounting plate 54 is suitably secured to the rear face 52f of the main body portion 52a of clamp plate 52 in overlying relation to opening 52e and defines a downwardly opening slot 54a.

Bushing 56 has a square outer periphery 56a and a round inner periphery or bore 56b sized to journal on the bearing portion 36b of shaft 36. Bushing 56 is mounted in slot 54a with its rear face 56c flush with the rear face of mounting plate 54 and the rear portion 52d of the bushing extending forwardly and axially through opening 52e. The lower portion of bushing 56 coacts with opening 52e to define a U-shaped groove 59 having a size and configuration conforming to the cross-sectional configuration of housing 22 proximate opening 22i.

Cover sleeve 58 has a square cross-sectional configuration and defines an inner periphery 58a corresponding in size and configuration to opening 52e in clamp plate 52 and sized to telescopically receive housing member 22. Sleeve 58 is suitably secured to the front face of clamp plate 52 in surrounding relation to opening 52e.

Rear clamp structure 34 includes a clamp plate 60, a nut or actuator 62 and a cover sleeve 64.

Clamp plate 60 includes a main body portion 60a, a lower flange portion 60b, an upper flange portion 60c, and a central rectangular open 60d in main body portion 60a. Nut 62 is positioned in opening 60d and includes a threaded central bore 62a sized to threadably coact with the threaded portion 36c of shaft 36, a main body portion 62b projecting rearwardly from plate 60, and shoulders 62c defined on opposite sides of main body portion 62b. Shoulders 62c coact with opening 60d and with the lower portion of main body portion 62b to define a U-shaped groove 65 having a size and configuration conforming to the cross-sectional configuration of housing 22 proximate opening 22i.

Cover sleeve 64 has a square tubular cross-sectional and is sized to telescopically receive housing member 22. The front end 64a of the sleeve is fitted over nut main body portion 62b and suitably secured thereto as by welding.

In the assembled relation of the various components of the invention anti-theft device, detent tube 28 is positioned in the rear end of housing 22 in abutting engagement with rear end wall 22f; shaft assembly 26 is positioned within housing member 22 with shaft 36 passing through an aperture 22g in rear end wall 22f for slidable receipt within detent tube 28; push rod 38 is slidably positioned within the hollow portion 36g of shaft 36 with rear end 38c projecting from the handle portion 36f of shaft 36 and with the forward end of the push rod 38a positioned proximate the blind end 36h of bore 36g; spring 40 is positioned in bore 36g between the forward end 38a of push rod 38 and bore blind end 36h so as to bear against the push rod; detent ball 42 is spaced from detent hollow 38d so that push rod 38 urges the detent ball outwardly into engagement with a detent groove 28a; nut portion 62b of rear clamp structure 34 threadably receives the threaded portion 36c of shaft 36 so as to mount clamp structure 34 on the shaft; bushing 56 of front clamp structure 32 is Journaled on the bearing portion 36b of shaft 36; the side walls 22b, 22c and bottom wall 22d of housing 22 so as to mount clamp structure 32 on the shaft, proximate opening 22i, are slidably received in grooves 69 and 65 with nut shoulders 62c and the lower edge of mounting plate 54 guiding on housing edges 22g; front flange portion 36a of shaft 36 is positioned against the front end 56e of bushing 56; foot 24 is pivoted on the front end of housing 22 by a pin 65 passing through foot lug portion 24b and through aligned apertures in lugs 22h formed on the front wall 22e of housing 22; a coil spring 66 surrounds pin 65 and urges the foot to a rest position from which it may move pivotally against the bias of the spring; cover sleeve 58 extends forwardly from clamp plate 52 in telescopic surrounding relation to housing 22 and in covering relation to opening 22i; and cover sleeve 64 extends rearwardly from clamp plate 60 is surrounding telescopic relation to tube 22 and in covering relation to opening 22i.

The assembly of the components is facilitated by the fact that plates 52, 60, by virtue of their square opening 52e, 60d, may be slid over housing 22 to a position proximate opening 22i whereafter the nut 62 and bushing 56 may be positioned on shaft 36 with the shaft positioned within housing 22, whereafter the nut 62 and bushing 56 may be secured to the plates 52, 60. The assembled elongated housing 22 and shaft 36 will be seen to constitute a strut assembly whose overall length may be selectably varied by relative axial sliding movement of members 22 and 36 and which has a forward end defined by the forward end of the housing 22 and a rearward end defined by the rearward end of shaft 36.

Operation

In the use of the invention anti-theft device, and with the clamp structures 32 and 34 in relatively axially separated positions, the device is positioned below the brake pedal 20 with the foot 24 proximate the fire wall 12, whereafter the device is moved upwardly to move the clamp structures into coacting positions forwardly and rearwardly of the brake pad, whereafter push rod 38 is pushed in to move detent hollow 38d into alignment with detent ball 42 to allow the ball to drop into the detent hollow, whereafter housing 22 is slid forwardly relative to shaft 36 to firmly position foot 24 against the fire wall 12, whereafter push button 38c is released to allow spring 40 to move the push rod rearwardly to urge detent ball 42 into locking engagement with a detent groove 28a, whereafter handle 36f is utilized to turn shaft 36 within housing 22 so as to advance clamp structure 34 toward clamp structure 32 to firmly clamp brake pad 20 therebetween, whereafter push button 46 of lock assembly 30 is depressed to move locking pin 50 transversely downwardly for passage through aligned locking apertures 36i, 36j in shaft 36 to the dotted line position seen in FIG. 2, whereby to lock the shaft 36 and housing 22 together to preclude relative axial or rotational movement therebetween. It will be seen that with the clamp structures clamped against the front and rear faces of the brake pedal 20, pedal arm 18 passes through cutout 52i in clamp plate 52 and the rear edge 18a of the pedal arm is received in a notch or cutout 60e in the front edge of the top flange 62 of clamp plate 60.

The brake pedal is now totally disabled so that, even if someone is able to gain unauthorized entry into the vehicle, the vehicle still cannot be driven since the brake pedal cannot be depressed to release the brake/shift interlock and allow the transmission to be shifted out of the park position. Further, even if the brake/shift interlock can somehow be defeated and the vehicle transmission shifted into a drive gear, the vehicle is still undrivable since it has no brakes.

Unauthorized removal of the invention anti-theft device from the brake pedal is extremely difficult as compared to prior art anti-theft devices. For example, whereas a typical prior art anti-theft device can be defeated by shears or snipping devices, the sheer bulk and complexity of the invention device makes it extremely difficult, if not practically impossible, to achieve unauthorized removal of the invention device from the brake pedal. Authorized removal of the device from the brake pedal is accomplished by insertion of the key 48 in the push button 46 of the lock assembly and turning of the key to withdraw the locking pin 50, whereafter the shaft 36 may be rotated relative to the housing 22 to move the rear clamp structure away from the front clamp structure, whereafter push rod 38 may be depressed to drop detent ball 42 into detent hollow 36d to allow the tube 22 and shaft 36 to be relatively telescoped, whereafter the device can be dropped downwardly out of engagement with the brake pedal.

The invention will be seen to provide an improved anti-theft device that is relatively simple in construction and operation but yet which is extremely difficult to defeat once installed.

Whereas a preferred embodiment of the invention has been illustrated and described in detail it will be apparent that various changes may be made in the disclosed embodiment without departing from the spirit or scope of the invention.

I claim:

1. A motor vehicle anti-theft device adapted to engage and disable a control pedal of the vehicle positioned rearwardly of the vehicle fire wall, said device comprising:

an elongated strut assembly having forward and rearward ends and including first and second generally coaxial elongated members respectively defining the forward and rearward ends of the strut assembly and mounted for relative rotary movement, and relative longitudinal sliding movement to selectively vary the overall coaxial length of the strut assembly;

a first clamp member mounted on one of said elongated members at a location intermediate the forward and rearward ends of the strut assembly and adapted to engage a face of the pedal;

a second clamp member threadably mounted on said one elongated member and adapted to engage an opposite face of the pedal; and means operative to lock the first and second elongated members together in any position of longitudinal sliding adjustment of said elongated members.

2. A motor vehicle anti-theft device according to claim 1 wherein:

the device further includes means operative in response to relative rotation of said elongated members to move said first and second clamp members together.

3. A motor vehicle according to claim 2 wherein:

the device is adapted to be applied to the pedal by positioning the clamp members on opposite sides of the pedal, relatively sliding the elongated members to move the forward end of the strut assembly against the vehicle fire wall, and relatively rotating the elongated members to clamp the clamp members on the pedal.

4. A motor vehicle anti-theft device of the type adapted to disable a control pedal of the vehicle to preclude operation of the control pedal, characterized in that:

the device includes an outer hollow elongated housing having a foot, an inner elongated shaft generally coaxial with the housing and mounted for rotary movement and longitudinal sliding movement within the housing, a first clamp member journalled on the shaft, a second clamp member threadably mounted on the shaft, and means precluding rotary movement of the second clamp member relative to the housing whereby the clamp members are moved together by rotation of the shaft;

the device is applied to the pedal by positioning the clamp members on opposite sides of the pedal, sliding the housing longitudinally relative to the shaft to engage the foot of the housing against the vehicle floor board, and rotating the shaft to clamp the clamp members on the pedal;

the device further includes lock means operative to selectively lock the housing and shaft against relative rotary and longitudinal movement;

the lock means includes a pin tumbler lock mounted on the housing and including a lock pin; and the shaft includes a plurality of locking bores for selective coaction with the lock pin to lock the shaft against relative rotary and axial movement within the housing and any of the plurality of axial positions of the shaft relative to the housing.

5. An anti-theft device according to claim 4 wherein the device further includes detent means between the shaft and the housing operative to detentingly maintain the shaft in a plurality of positions of axial adjustment within the housing and means for releasing the detent means to selectively allow relative axial movement of the shaft within the housing.

6. The anti-theft device according to claim 5 wherein the shaft projects out of one end of the housing to define an exposed shaft portion and a handle is provided on the exposed shaft portion to facilitate turning of the shaft to move the clamp members together.

7. A motor vehicle anti-theft device according to claim 6 wherein:

the device is operated by positioning the clamp member proximate one face of the pedal and relatively sliding the elongated members to position the forward end of the strut assembly against the vehicle floorboard.

8. An anti-theft device according to claim 7 wherein:

said clamp member comprises a first clamp member;

the device further includes a second clamp member mounted for axial movement relative to the first clamp member; and the device is applied to the pedal by positioning the clamp members on opposite sides of the pedal, slidably moving the elongated members to position the forward end of the strut assembly against the vehicle fire wall, and moving the clamp members relatively axially to clamp the clamp members on the pedal.

9. A motor vehicle anti-theft device adapted to engage and disable a control pedal of the vehicle, said device comprising:

inner and outer elongated members mounted for relative telescopic axial movement;

a pair of clamp members mounted on the inner telescopic member and adapted to respectively engage opposite faces of the pedal;

means operative to translatorily and axially move the clamp members together; and means operative to lock the inner and outer elongated members together in any position of telescopic adjustment of the members.

10. An anti-theft device according to claim 9 wherein:

the means operative to move the clamp members axially together comprises means operative in response to relative rotational movement of the inner and outer elongated members.

* * * * *